United States Patent
Takahashi et al.

(10) Patent No.: US 7,223,496 B2
(45) Date of Patent: May 29, 2007

(54) ELECTROCHEMICAL ELEMENT

(75) Inventors: Tadayoshi Takahashi, Neyagawa (JP); Nobuharu Koshiba, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 301 days.

(21) Appl. No.: 10/068,713

(22) Filed: Feb. 6, 2002

(65) Prior Publication Data

US 2002/0106559 A1 Aug. 8, 2002

Related U.S. Application Data

(63) Continuation of application No. PCT/JP01/04830, filed on Jun. 7, 2001.

(30) Foreign Application Priority Data

Jun. 9, 2000 (JP) ............................ 2000-173137

(51) Int. Cl.
*H01M 2/02* (2006.01)
*H01M 2/08* (2006.01)

(52) U.S. Cl. ................. 429/171; 429/167; 429/173; 429/174

(58) Field of Classification Search ............. 429/171, 429/174, 167, 173
See application file for complete search history.

(56) References Cited

U.S. PATENT DOCUMENTS 4,772,291 A * 9/1988 Shibanai et al. ........... 8/526
5,332,633 A 7/1994 Adamson et al.
6,146,789 A * 11/2000 Horie et al. ............... 429/185

FOREIGN PATENT DOCUMENTS

| JP | 56057254 A | 5/1981 |
|----|------------|--------|
| JP | 62188164 A | 8/1987 |
| JP | 63080471 A | 4/1988 |
| JP | 03037955 A | 2/1991 |
| JP | 7-105920 A | 4/1995 |
| JP | 10055789 A | 2/1998 |
| JP | 10170386 A | 6/1998 |
| JP | 10261388 A | 9/1998 |
| JP | 2000138042 A | 5/2000 |

* cited by examiner

*Primary Examiner*—Patrick Joseph Ryan
*Assistant Examiner*—Julian Mercado
(74) *Attorney, Agent, or Firm*—Akin Gump Strauss Hauer & Feld LLP

(57) ABSTRACT

An electrochemical element having a metal case for accommodating an element unit in which a positive electrode and a negative electrode are disposed to face each other with a separator between them, and an electrolyte; a sealing body for sealing an opening of the metal case; and a sealant provided between the metal case and the sealing body, wherein the sealant comprises an elastomer as a main component and an organic pigment and is colored in a color different from the metal case and sealing body. The present invention also includes an electrochemical element which further has a gasket interposed between the sealing body and the metal case, and in which the sealant is provided between the gasket and the sealing body or the metal case.

11 Claims, 3 Drawing Sheets

ELECTROCHEMICAL ELEMENT

CROSS-REFERENCE TO RELATED APPLICATION

This application is a continuation of International Application No. PCT/JP01/04830, filed Jun. 7, 2001, the disclosure of which is incorporated herein by reference.

TECHNICAL FIELD

The present invention relates to electrochemical elements utilizing an electrochemical reaction, such as organic electrolyte batteries for use as the main power source or memory backup power source of electronic equipment, or electric double layer capacitors and aluminum-electrolytic capacitors. More specifically, the present invention relates to an electrochemical element having a structure capable of recognizing the application state of a sealant provided in a sealing section of a container.

BACKGROUND ART

Most of electrochemical elements comprise an element unit in which a pair of electrodes are disposed to face each other with a separator therebetween; an electrolyte; and a container for accommodating them. In general, this container is composed of a metal case having an opening, and a sealing body for sealing the opening. Moreover, in order to ensure electrical insulation between the metal case and the sealing body, a gasket is sometimes interposed between them. Further, a sealant is provided between the metal case and the sealing body, or between the gasket and the metal case or the sealing body. Note that the metal case is available in various shapes, such as a cylindrical shape with a bottom, a rectangular shape and a button shape.

The sealant is required to have the functions of preventing the electrolyte from leaking out or evaporating and preventing infiltration of moisture from the outside. In particular, in an electrochemical element using a nonaqueous electrolyte as the electrolyte, since moisture has an adverse effect on the nonaqueous electrolyte and the electrodes, a sealant is used with a view to prevent the infiltration of moisture into the element.

A variety of sealant has been conventionally proposed. Among them, asphalt pitch, coal tar or the like has been most widely used. Moreover, one obtained by mixing the pitch with a mineral oil (Japanese Examined Patent Publication No. 61-36344) and one obtained by mixing the pitch with a silicone rubber (Japanese Laid-Open Patent Publication No. 63-80471) were proposed as the sealants that hardly cause an electrolyte leakage under high temperature/low temperature.

An electrochemical element as described above is directly mounted on a circuit board with a decrease in the size of the element. The major mounting method is automatic soldering by a reflow method. In recent years, in view of various problems in the environmental aspect, there has been a worldwide tendency toward lead-free products. Accordingly, there is urgent necessity to develop parts that can correspond to high-temperature reflow automatic mounting using lead-free solder. However, while the parts to be mounted have been made resistant to high temperature one after another, it is difficult to make electrochemical elements correspond to the high-temperature reflow automatic mounting because they are parts for storing energy, and the realization of high-temperature resistant electrochemical elements as products is much behind as compared to other parts to be mounted. The major reason for this is that the electrochemical element is exposed to a high-temperature condition (under an environment of 250° C. at the peak for around several seconds) in passing through the inside of a reflow furnace, receives extremely high thermal stress and then bursts or causes performance degradation.

In order to solve such problems, the present inventors proposed in the past a sealant made of an elastomer, such as butyl rubber and styrene butadiene rubber, and having both the heat resistant and sealing properties (Japanese Laid-Open Patent Publication No. 2000-138042). This sealant achieved a significant reduction in the rate of occurrence of electrolyte leakage. However, the occurrence of electrolyte leakage was recognized during long-time storage though it was a very few.

As the result of studying in detail the cause of the occurrence of electrolyte leakage, the present inventors found that variations in the applied or coated position of the sealant and the uniformity of a film made of the sealant are the causes of the occurrence of electrolyte leakage. Moreover, since the sealant proposed by the present inventors previously is transparent and colorless, it is extremely difficult to confirm by visual observation or image recognition the applied position and the uniformity of the film in a state where the sealant is applied to the gasket. Therefore, it is considered that elements whose evaluation values about the applied position and the uniformity of the film are out of the specified values can not be removed as defective units on the production process, resulting in the occurrence of electrolyte leakage. In order to prevent the occurrence of such a defect, a prior example (Japanese Laid-Open Patent Publication No. 3-37955) that judges the applied state of the sealant by image data discloses a structure for distinguishing the sealant from a background by adding a white powder or a luminescent material to the sealant as auxiliary means for performing image recognition. However, such a powder and luminescent material have substantially no function as the sealant, and they sometimes cause degradation of the sealing performance.

In order to solve the above-mentioned conventional problems, it is an object of the present invention to provide an electrochemical element having a structure capable of confirming simultaneously the applied position and the uniformity of the film thickness of a sealant applied to the case, sealing plate and gasket of the electrochemical element by visual observation or image recognition, without adversely affecting the characteristics of the sealant.

DISCLOSURE OF INVENTION

The present invention provides an electrochemical element comprising: an element unit in which a positive electrode and a negative electrode are disposed to face each other with a separator therebetween; an electrolyte in contact with the element unit; a metal case for accommodating the element unit and the electrolyte; a sealing body for sealing an opening of the metal case; and a sealant provided between the metal case and the sealing body, wherein the sealant comprises an elastomer as a main component and an organic pigment and is colored in a color different from the metal case and sealing body.

The present invention also provides an electrochemical element comprising: an element unit in which a positive electrode and a negative electrode are disposed to face each other with a separator therebetween; an electrolyte in contact with the element unit; a metal case for accommodating the element unit and the electrolyte; a sealing body for sealing an opening of the metal case; a gasket interposed between the metal case and the sealing body; and a sealant provided between the gasket and the metal case or the sealing body, wherein the sealant comprises an elastomer as a main component and an organic pigment and is colored in a color different from the metal case, gasket and sealing body.

Here, the organic pigment is preferably an organic pigment made of a phthalocyanine-based metal complex.

In accordance with the present invention, the sealant composed mainly of an elastomer is colored by an organic pigment, and its color tone is set so as to be different from the metal case and the sealing body, and also preferably from the gasket. Therefore, when a solution of the sealant is prepared and a coating film is formed by the application of this solution in the production process, it is possible to evaluate and judge the applied state based on the difference in the saturation or color tone between the sealant and the respective components such as the metal case, thereby enabling a reduction in variations of the applied state. In particular, in the production process using an image recognition device, not only the applied position of the sealant can be recognized by the position of the colored portion, but also the applied position can be accurately controlled by feeding back the result of the recognition of the applied position to an applicator.

Moreover, it is possible to know the applied state, such as unevenness and a blur, of the sealant from the colored state of the applied sealant and estimate the film thickness of the sealant. By reflecting the result of the recognition on the control of the applicator in the same manner as for the applied position, it is possible to minimize the unevenness of the film thickness of the sealant. Furthermore, since only an amount which is necessary and sufficient for ensuring the sealing of the element is applied, it is possible to reduce the applied amount of the sealant.

As described above, since the sealant of the present invention is colored by an organic pigment which has a chemical affinity with the elastomer as the main component and a specific gravity substantially the same as that of the elastomer, it has a structure in which the pigment particles are evenly dispersed. Therefore, in the solution of the sealant of the present invention, precipitation and separation of the pigment can never occur. Whereas the above-mentioned prior example (Japanese Laid-Open Patent Publication No. 3-37955) shows a structure of merely mixing a white powder or a luminescent material with a sealant such as asphalt and wax. Therefore, when such a sealant is used in an electrochemical element intended to be directly mounted on a substrate by a reflow method, or an electrochemical element to be used in a high-temperature environment, the function of the sealant is not performed. The reason for this is that asphalt and wax flow when they are exposed to high temperature.

Additionally, in the above-mentioned prior example, titanium oxide ($TiO_2$) and fluorescent material are given as specific material names of the white powder and the luminescent material, respectively. In the case where a solution for coating is prepared by adding the former inorganic pigment to the solution of the sealant composed mainly of the elastomer of the present invention, since the specific gravity of the inorganic powder is relatively large (for example, the specific gravity of titanium oxide is 3.8 to 4.2), the powder is likely to separate and precipitate in the sealant. Consequently, the white powder is unevenly present in the coating film, and, if such a coating film is applied to a battery, it becomes a cause of occurrence of electrolyte leakage. Moreover, in order to obtain a uniform coating film, it is necessary to prevent aggregation and precipitation of the white powder by always mixing and stirring the solution of the sealant, and the application process of the sealant becomes complicated.

In the case of the latter luminescent material, the fluorescent material is soluble in organic electrolytes. Therefore, there is a possibility that the luminescent material in the sealant reacts with an organic electrolyte to be dissolved therein and does not perform the function as the sealant.

On the other hand, since the sealant of the present invention is colored by an organic pigment which is evenly mixed with and dispersed in the elastomer as described above, it can never cause characteristic deterioration resulting from degradation of the function of the sealant applied to the element.

Besides, the coloring of the sealant is selectable according to the color tones of the metal case, sealing body and gasket, and the degree of freedom is high. In particular, since an image recognition device which is introduced in the production process is affected by the characteristics of the device and environment as well as the colors of the respective components, it is preferable to select one by considering the respective effects. Accordingly, the recognition accuracy of the applied state, i.e., the applied position and the film thickness, can be significantly improved.

Since the sealant of the present invention is composed mainly of an elastomer, even when the electrochemical element is passed through a reflow furnace, it is possible to maintain the sealing characteristic in the container of the electrochemical element without causing the melting of the sealant. In addition, since the sealant of the present invention can follow the deformation of components resulting from the addition of thermal stress, particularly, the expansion and shrinkage of the gasket, it is possible to significantly improve the sealing performance of the electrochemical element.

As described above, in accordance with the structure of the present invention, the sealant can be applied in a uniform film thickness to predetermined positions, such as the peripheral portion of the sealing body, the inside peripheral portion of the case and the gasket, thereby producing the effect of preventing occurrence of electrolyte leakage due to variations in the applied position and the film thickness. Since both the elastomer and organic pigment forming the sealant have excellent heat resistance and the adhesion between the sealant and other components are excellent, the sealing performance can be maintained against an excessive temperature change and thermal stress during the mounting by a reflow method. It is therefore possible to obtain an electrochemical element with a reduced probability of occurrence of electrolyte leakage.

BEST MODE FOR CARRYING OUT THE INVENTION

An electrochemical element of the present invention is characterized in that a sealant used in a sealing section is formed from a specific rubber component and a specific organic pigment. More specifically, the sealant is composed mainly of an elastomer and colored by adding the organic pigment to the elastomer. Accordingly, the sealant is colored in any color different from the color tones of a metal case, sealing body and gasket, so that, when the sealant is applied to the metal case, etc., the applied condition is easily confirmed by visual observation or image recognition.

The following description will explain a specific embodiment of the present invention.

Figure 1:
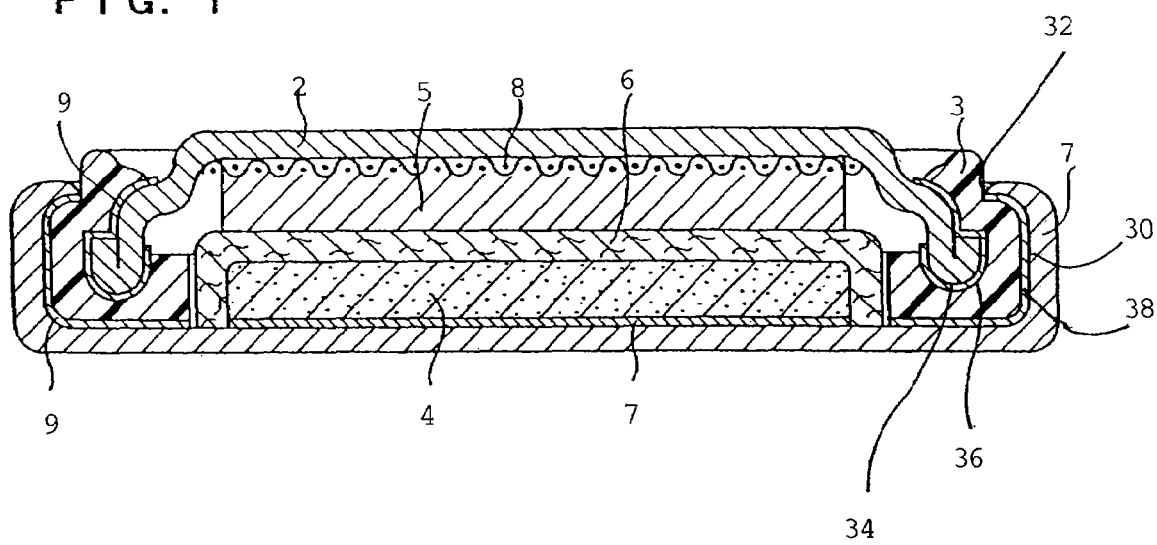
FIG. 1 is a vertical cross sectional view of a flat type nonaqueous electrolyte battery according to one example of the present invention.

FIG. 1 is a vertical cross sectional view of a flat type organic electrolyte battery with a thickness of 2.1 mm and a diameter of 6.8 mm. This battery is formed using a material having resistance to heat of around 250° C. so that it has a high-temperature environment resistant characteristic capable of corresponding to automatic soldering using a reflow method. Moreover, lithium manganate and a lithium-aluminum alloy are used for the positive electrode and the negative electrode, respectively.

In FIG. 1, 1 represents a battery case for accommodating a power generating element. This case 1 also functions as a positive electrode terminal and is made of stainless steel having an excellent corrosion resistance. A container for sealing the power generating element is constructed by the case 1, a sealing plate 2 that is made of stainless steel and functions as a negative electrode terminal, and a gasket 3 interposed between the case 1 from the sealing plate 2. The gasket 3 is made of poly(phenylene sulphide), for example. This gasket 3 has a function of fluid-tightly sealing the power generating element in the battery container in addition to a function of insulating the case 1 from the sealing plate 2.

The sealant is applied to an inner face portion of the gasket 3 that comes in contact with the sealing plate, i.e., an inner side portion from the raised portion through the bottom face, and an inner side portion of the case 1 from the raised portions through the peripheral portion of the bottom. After applying the sealant, the gasket 3 and the sealing plate 2 are incorporated in this order in the opening of the case 1 and the peripheral portion of the case 1 is bent inward, thereby making caulked sealing. In the figure, a film of the sealant is represented as 9. The metal case 1 has a major inner face 30 and a minor inner face 32. It can be seen that sealant 9 is in the form of a layer sandwiched between the major inner face 30 of the metal case 1 and a major outer face 38 of gasket 3, and also between a major inner face 36 of gasket 3 and a major outer face 34 of the sealing plate 2.

A positive electrode 4 is obtained by mixing carbon black as a conductive agent and a fluorocarbon resin powder as a binder to lithium manganate as an active material, forming the resulting mixture into a pellet with a diameter of 4 mm and a thickness of 1.2 mm and then drying the pellet at 250° C. for 12 hours. The obtained pellet-like positive electrode 4 is placed on a positive electrode collector 7 formed by applying a carbon coating to the bottom face of the case 1 and drying it. A negative electrode 5 is made of a lithium-aluminum alloy obtained by electrochemically alloying metallic lithium and aluminum. The production method thereof is as follows. First, a collector 8 made of a stainless steel net is joined to the inner face of the sealing plate 2 and then aluminum in the shape of a disk with a diameter of 4 mm and a thickness of 0.3 mm is bonded thereto by the application of pressure. Next, lithium metal in the shape of a sheet is bonded to the surface of the aluminum by the application of pressure. During the assembly of a battery, when an organic electrolyte is pored into the battery container, the lithium and aluminum are brought into a short-circuited state, the lithium is electrochemically absorbed into the aluminum, and the lithium-aluminum alloy is formed.

A separator 6 provided between the positive electrode 4 and the negative electrode 5 is made of poly(phenylene sulfide). The organic electrolyte is one obtained by dissolving 1 mol/l of lithium bisperfluorosulphonyl imide LiN(CF$_3$SO$_2$)$_2$ in sulfolane as a solvent, and the battery case is filled with 15 μl of the organic electrolyte.

Figure 2:
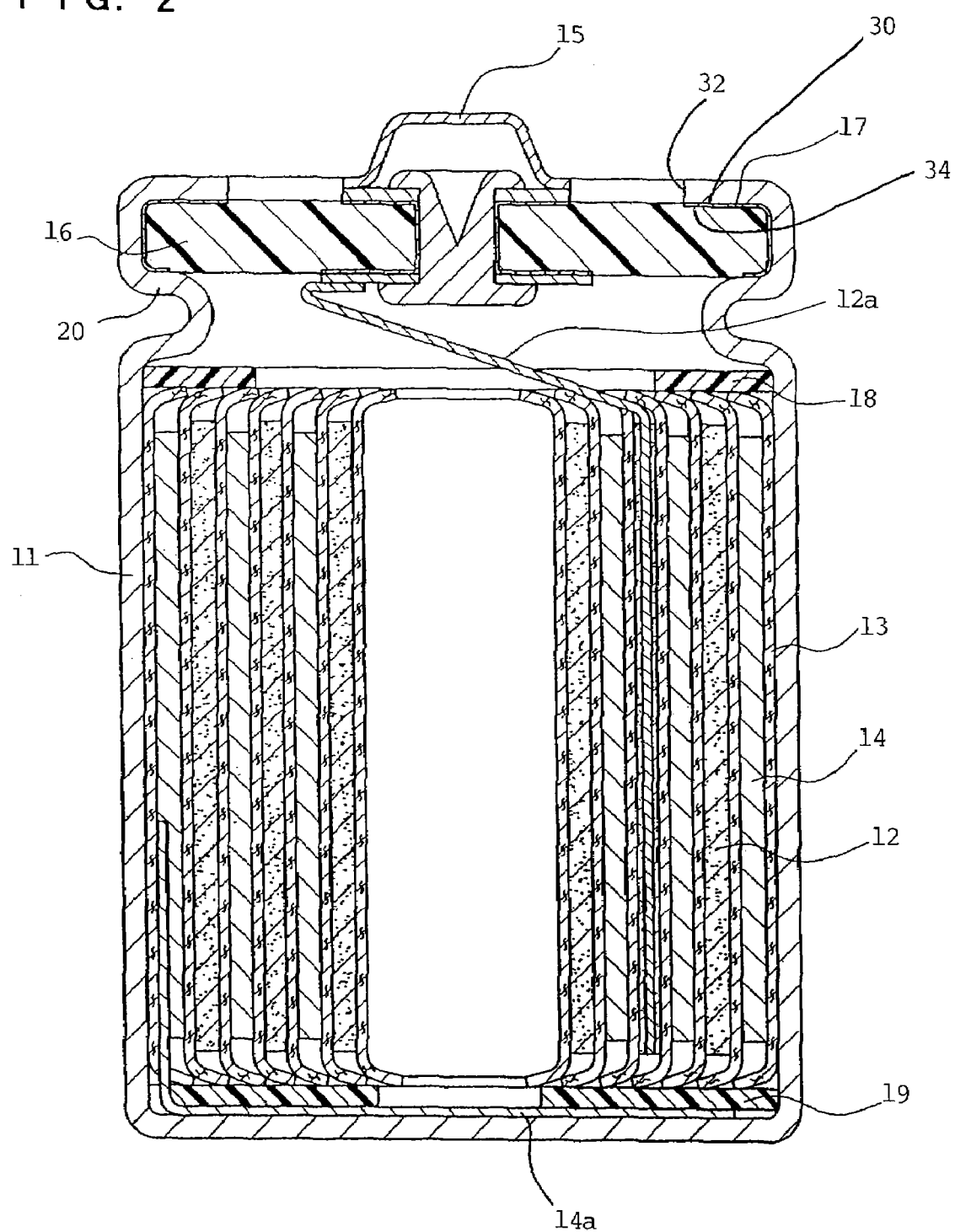
FIG. 2 is a vertical cross sectional view of a cylindrical type nonaqueous electrolyte battery according to another example of the present invention.

FIG. 2 is a cross sectional view showing a state in which the sealant is provided in the sealing section of a cylindrical type nonaqueous electrolyte battery as one electrochemical element.

A metal case 11 accommodates therein an element unit in which a positive electrode 12 and a negative electrode 14 are disposed to face each other with a separator 13 therebetween, and a nonaqueous electrolyte. However, the nonaqueous electrolyte is omitted in FIG. 2. The element unit is formed by winding the layered positive electrode 12, negative electrode 14 and separator 13.

An upper insulating ring 18 and a lower insulating ring 19 for certainly preventing a short circuit of the electrodes are provided at the upper and lower parts of the element unit. Then, a positive electrode lead 12a connected to the positive electrode 12 is electrically connected to a positive electrode terminal 15 provided on a sealing body 16. A negative electrode lead 14a connected to the negative electrode 14 is electrically connected to the metal case 11 that also functions as a negative electrode terminal. Further, a sealant 17 is provided between the opening of the metal case 11 and the peripheral portion of the sealing body 16. After positioning the element unit and the upper and lower insulating rings in the metal case 11, a ring-shaped recessed section is formed near the opening of the case so as to form a step section 20 for receiving the sealing body. Next, the sealant is applied to the inner circumferential face of the opening of the case 11 in a thickness of 5 to 100 μm. The film of the sealant is represented as 17. The film of sealant 17 is in the form of a layer sandwiched between the major inner face 30 of the metal case 11 and the major outer face 34 of the sealing body 16. As a method for judging the applied state of the sealant by image recognition, a method disclosed in the above-described prior example is applicable.

Figure 3:
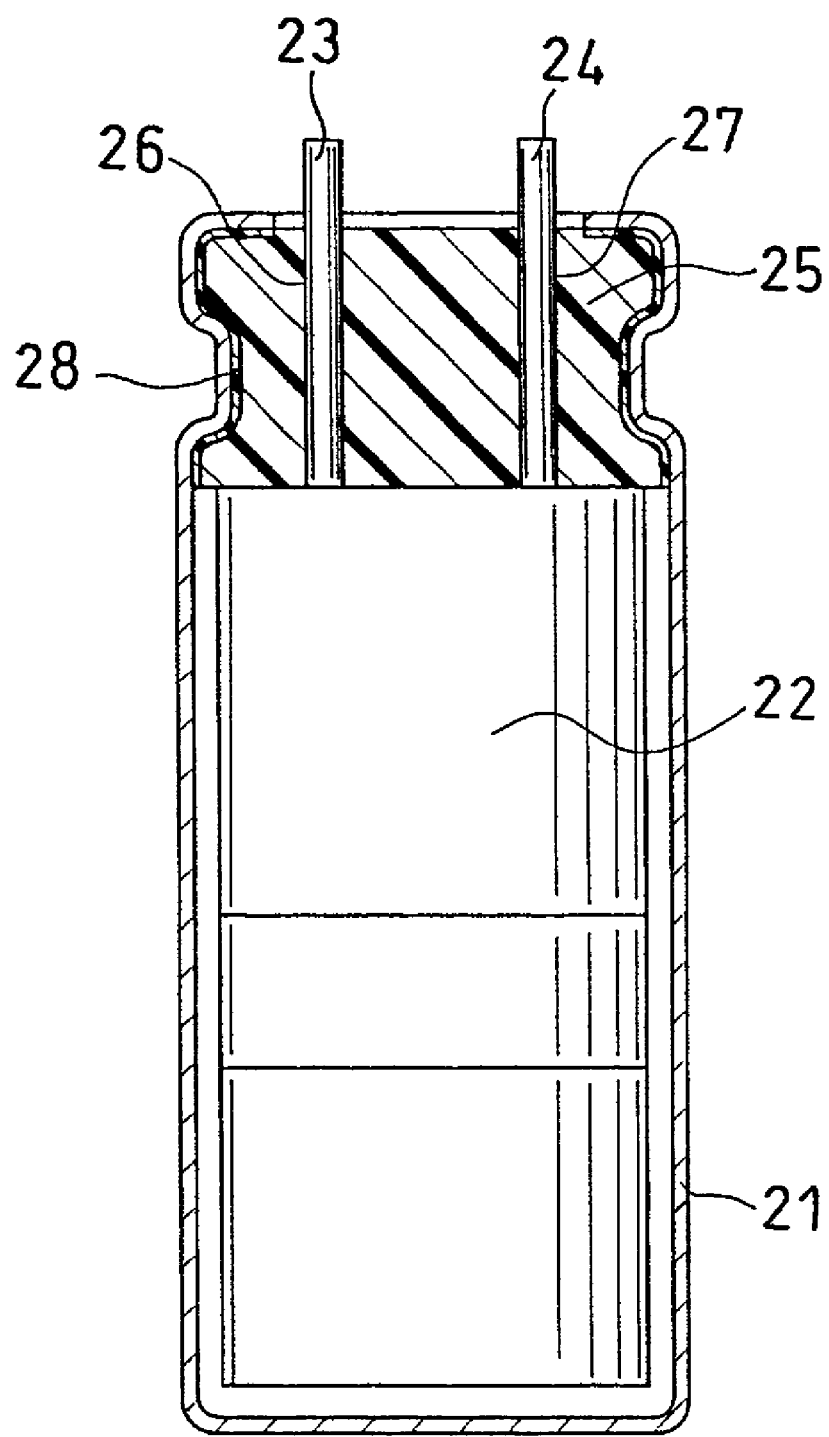
FIG. 3 is a vertical cross sectional view of an electric double layer capacitor according to still another example of the present invention.

FIG. 3 shows a state in which the sealant is provided in the sealing section of an electric double layer capacitor that is an electrochemical element. A metal case 21 accommodates therein an element unit in which a pair of polarized electrodes made of activated carbon are disposed to face each other with a separator therebetween, and a nonaqueous electrolyte. However, the nonaqueous electrolyte is omitted in FIG. 3. An element unit 20 is formed by layering a positive electrode, a negative electrode, and a separator for separating the electrodes and by winding the layers, although its cross section is not shown in FIG. 3. A positive electrode lead 23 and a negative electrode lead 24 are connected to the positive electrode and the negative electrode, respectively.

The opening of the metal case 21 is sealed with a sealing body 25 made of a synthetic resin or a rubber so as to prevent evaporation of the nonaqueous electrolyte in the case. The open end of the metal case 21 is crimped onto the upper circumferential part of the sealing body 25 by applying a shrinking process to the outer circumference. The sealing body 25 has two through-holes 26 and 27, and the positive electrode lead 23 and the negative electrode lead 24 are guided to the outside through these through-holes. Further, a film 28 of the sealant is provided between the opening of the metal case 21 and the side section and peripheral portion of the upper face of the sealing body 25. The sealant may also be provided between the positive electrode lead 23 and negative electrode lead 24 and the inner faces of the through-holes 26 and 27.

By applying the sealant in a thickness of 5 to 100 μm to a position corresponding to the sealing section of the element on the surface of the metal case, sealing body or gasket and then assembling an element, it is possible to obtain an element of the present invention.

Since the sealant of the present invention is composed mainly of an elastomer, it has a higher adhesive strength compared to the pitch as a known sealant. Therefore, even when the metal case, sealing body or gasket is expanded or shrunk due to an abrupt change in temperature during mounting by a reflow method, the sealant of the present invention can follow the change. It is thus possible to certainly prevent an electrolyte leakage without impairing the sealing characteristic of the element by a change in temperature.

For the elastomer as the main component of the sealant, it is possible to use chloroprene rubber and acrylic rubber containing carbon and hydrogen elements, and more preferably an elastomer obtained by using one selected from the group consisting of butadiene rubber, nitrile rubber, isobutylene rubber, butyl rubber, ethylene-propylene rubber and ethylene-propylene-diene monomer rubber alone or by combining a plurality of these rubbers. It is also possible to apply a silicone rubber and fluorosilicone rubber containing silicon and oxygen atoms in high ratios in the structural formula. These rubbers contain carbon and hydrogen atoms in the structural formula, and have a high affinity with organic pigments like the elastomers because the silicon and carbon are elements of the same group. In general, these elastomers are colorless and transparent or white, and they can be colored in any color by combining them with later-described organic pigments.

As the organic pigment that is combined with each of the above-mentioned elastomers so as to form a sealant, it is possible to use lake red, methyl violet, eosine lake, green gold, phthalocyanine blue, phthalocyanine green, etc. With the use of them, it is possible to enable coloring shown in Table 1.

TABLE 1

| Coloring | Name of Organic Pigment |
|---|---|
| Red | Lake Red |
|  | Eosine Lake |
| Green | Phthalocyanine Green |
| Yellowish Green | Green Gold |
| Blue | Phthalocyanine Blue |
| Violet | Methyl violet Lake |

In Table 1, phthalocyanine-based metal complexes such as phthalocyanine blue and phthalocyanine green are strongest in terms of the coloring strength of the organic pigments and can achieve a reduction in the amount to be added to the sealant, and thus the phthalocyanine-based organic pigments have an advantage over other organic pigments.

Organic pigments made of phthalocyanine-based metal complexes are compounds obtained by substituting two hydrogen ions in the center of a phthalocyanine compound with transition metal ions such as copper, cobalt, iron, nickel and zinc. In addition to the strong color tones as described above, these compounds have high stability, i.e., organic solvent resistance, alkali resistance and acid resistance, with respect to various types of electrolytes such as organic solvents. Moreover, since these compounds have a specific gravity of around 1.4 that is similar to elastomers (the specific gravity of 1.3 to 1.6) as the main component of the sealant of the present invention, when the organic pigment is added to and dispersed in the sealant, it can never separate. Furthermore, the phthalocyanine-based organic pigments are superior in terms of the heat resistance and can present in a stable manner even when they are exposed to a high-temperature environment as in reflow.

The organic pigments are extremely superior in the aspect of the dispersibility to elastomers as compared to the dispersibility of inorganic pigments, and prevent partial color unevenness in producing a sealant. The reasons why the organic pigments have excellent dispersibility are that the organic pigments have a specific gravity substantially equal to that of elastomers, and also the ligand of metal ions comprising carbon and hydrogen that are the characteristics of the organic pigment and the elastomer that is a structure containing mainly carbon and hydrogen are chemically attracted to each other to a very week degree. On the other hand, in general, inorganic pigments are composed mainly of metal or metal oxides, and their specific gravity is two or more times larger than that of elastomers. Moreover, since the inorganic pigments lack the affinity with elastomers, the pigments start to precipitate as soon as they are mixed with elastomers, resulting in sealants having uneven color.

Dyes used as coloring means together with organic and inorganic pigments are generally unstable with respect to an organic electrolyte, and have a possibility of dissolving. Thus, when an electrochemical element is stored in a long time, the dye component in the sealant may come in contact with the organic electrolyte to cause dissolution of the dye, possibly affecting the reliability.

Whereas the organic pigments are extremely stable with respect to an organic electrolyte, and even when they are stored in a long time, the pigment component in the sealant is not dissolved, and thus the organic pigments do not affect the long-term reliability of batteries at all.

Next, the coloring of the sealant using the above-mentioned organic pigments will be explained.

As described above, since the elastomer that is the main component of the sealant is colorless and transparent or white, the color of the sealant itself becomes darker as the amount of the organic pigment contained in the sealant increases. Therefore, by increasing the difference between the color of the gasket and the saturation of the colored sealant, it is possible to easily confirm the applied position and the uniformity of the film of the sealant by visual observation or image recognition. For instance, when an opalescent resin is used for the gasket, the recognition accuracy of the applied condition is improved by applying the sealant colored in a dark color, particularly in black or violet color. With the colorless and transparent sealant or white sealant, since the color is similar to the color of the gasket, it is difficult to distinguish the colors and a high accuracy can not be expected in recognizing the sealant even if the amount of the organic pigment is increased. Thus, by coloring the sealant in a color different from the color of a portion to which the sealant is applied, it is possible to decrease the amount of the organic pigment to be added to the sealant. In addition to such recognition accuracy in the production process, if the heat resistance is taken into consideration, phthalocyanine blue in the phthalocyanine-based organic pigments is most preferred because of its heat resistance and the darkness of the color.

Regarding the percentage of the organic pigment in the sealant, when the amount of the organic pigment increases, the recognition accuracy of the applied condition is improved. Meanwhile, the amount of the elastomer in the sealant relatively decreases, and the sealing effect that is the most important function required for the sealant is lowered. Therefore, the adhesion quality at the contact surface with the polymer of the sealing body or the gasket is impaired, and the probability of occurrence of electrolyte leakage increases. Accordingly, there is a suitable range for the percentage of the organic pigment in the sealant. More specifically, around 10 to 30 percent by weight is preferred.

The following description will explain an example of the application of the present invention to a flat type nonaqueous electrolyte battery. However, this is merely an example of the present invention, and the present invention is not limited to this.

EXAMPLE 1

A battery having the structure of FIG. 1, using poly(phenylene sulfide) for the gasket 3 and the separator 6, was fabricated.

For the sealant, a butyl rubber was used as the elastomer, and phthalocyanine blue was used as the organic pigment. A solution was prepared by dissolving a mass of butyl rubber in toluene, and a fine powder of phthalocyanine blue was added to this. The solution of the sealant thus prepared was applied to predetermined positions of the gasket 3 and case 1. This application was executed manually, and further the applied condition was confirmed by visual observation. After the application of the sealant, by evaporating the toluene, a butyl rubber film containing the organic pigment was formed. The percentage of the butyl rubber and pigment in the solution for coating was 5% by weight, and the component ratio of the butyl rubber and the organic pigment was 40 parts by weight of the pigment based on 60 parts by weight of the butyl rubber.

With the use of the case and gasket to which the sealant was applied in the above-described manner, a battery having the structure as shown in FIG. 1 was fabricated. The gasket and separator made of poly(phenylene sulfide) were used. This battery is represented as A.

EXAMPLE 2

Except that lake red was used in place of phthalocyanine blue as the organic pigment of the battery A, a battery B having the same structure as the battery A was fabricated.

EXAMPLE 3

Except that green gold was used as an organic pigment in place of phthalocyanine blue as the organic pigment of the battery A, a battery C having the same structure as the battery A was fabricated.

COMPARATIVE EXAMPLE 1

Except that oil red was used as a dye in place of phthalocyanine blue as the organic pigment of the battery A, a battery D having the same structure as the battery A was fabricated.

COMPARATIVE EXAMPLE 2

Except that titanium oxide was used as an inorganic pigment in place of phthalocyanine blue as the organic pigment of the battery A, a battery E having the same structure as the battery A was fabricated.

COMPARATIVE EXAMPLE 3

By applying a toluene solution in which only the butyl rubber was dissolved to predetermined positions and evaporating the toluene, a battery F comprising the film 9 of the sealant shown in FIG. 1 that was composed of only butyl rubber was assembled. The concentration of the butyl rubber in the toluene solution used was 3% by weight.

High-temperature environment resistant characteristic tests were performed for the obtained battery A through battery C of the examples and batteries D through F of the comparative examples by passing each battery through a high-frequency heated ref low furnace. As for the temperature profile of the inside of the reflow furnace through which each battery passes, each battery was left under the environment of 180° C. for two minutes as the preheating process, subsequently passed through each of the environments of 180° C., 245° C. and 180° C. in 15, 5 and 15 seconds, respectively, as the heating process, and then cooled naturally to room temperature. In the present examples, it was confirmed before inserting 1000 pieces of each of the battery A through battery F into the reflow furnace that no electrolyte leakage occurred, and then each battery was passed through the reflow furnace at the above-described temperature profile and inspected for the rate of occurrence of electrolyte leakage. The batteries in which an electrolyte leakage did not occur were passed through the reflow furnace again, and the rate of occurrence of electrolyte leakage was examined. The rate of occurrence of electrolyte leakage is shown in Table 2 below.

TABLE 2

| | Colorant | Occurrence of electrolyte leakage after passing reflow furnace |
|---|---|---|
| Battery A | Phthalocyanine Blue | 0/1000 |
| Battery B | Lake Red | 5/1000 |
| Battery C | Green Gold | 3/1000 |
| Battery D | Oil Red | 28/1000 |
| Battery E | Titanium oxide | 16/1000 |
| Battery F | None | 35/1000 |

According to Table 2, the batteries A, B and C are superior in the leakage resistance after the passage of the reflow furnace as compared to the battery F of the comparative example containing no pigment in the sealant. The applied position and the applied state such as unevenness and a blur of the colored sealant can be easily confirmed by visual observation because of the difference in the saturation between the sealant and the gasket 3, case 1 and sealing plate 2. Therefore, the layer of the sealant is uniformly formed in the sealing section and the variation thereof is reduced, and the probability of occurrence of electrolyte leakage is significantly decreased. Moreover, while the coloring of the sealant was changed for the batteries A through C, the difference in the rate of occurrence of electrolyte leakage depending on the types of the organic pigments added to the sealant is small. The present inventors also confirmed that there was no difference in the rate of occurrence of electrolyte leakage if the types of organic pigments and the percentage thereof added to the sealant were within the range specified in the above-described embodiment.

On the other hand, regarding the battery D of Comparative Example 1 in which a dye (oil red) was added to the sealant and the battery E of Comparative Example 2 in which an inorganic pigment (titanium oxide) was added to the sealant, it was confirmed that the sealant of each battery was colored and the sealant layer in the sealing section was uniformly formed. However, the battery D to which the dye was added was affected by the heat during the reflow, and it was deemed that the electrolyte leakage occurred because dissolution of the dye in the organic electrolyte and degradation of the sealing performance occurred in addition to degeneration of the dye. Although the battery E to which the inorganic pigment was added was not subjected to the influences such as decomposition and degradation by the organic electrolyte or degeneration by heat, it was deemed that a portion where the inorganic pigment was unevenly present was created when the sealant was applied, the sealing performance in this portion was degraded, and consequently the electrolyte leakage occurred.

In the case where the butyl rubber containing no pigment is used, since the film of the applied sealant is colorless and transparent, it is extremely difficult to perform the application work while confirming the applied position and the states of unevenness and a blur of the sealant and further difficult to judge these states from the condition after the application. For this reason, even when there is unevenness or a blur of the applied sealant or even when the sealant is applied to a place away from a predetermined position, the state of the sealant can not be confirmed by visual observation, resulting in variations in the applied state. It was therefore considered that batteries in which the sealant was not formed at the predetermined position or in a predetermined film thickness were present due to variations in the applied state, and these batteries had an electrolyte leakage after passing through the reflow furnace.

In the examples, flat batteries containing a power generating element in a flat battery container have been explained, but the present invention is also applicable to cylindrical batteries or rectangular batteries. Moreover, organic electrolyte batteries comprising an organic solvent have been explained, but since the elastomers as the main component of the sealant of the present invention are stable with respect to aqueous electrolytes, if the elastomers are combined with organic pigments which are stable with respect to these electrolytes, it is possible to use the sealant of the present invention not only in organic electrolyte batteries, but also in secondary batteries such as nickel-metal hydride batteries, nickel-cadmium storage batteries and lead acid storage batteries; and primary batteries such as manganese dry batteries and alkaline manganese batteries.

In the examples, while sulfolane was used for the organic electrolyte, the present inventors have confirmed that organic electrolytes using one or more kinds of solvents selected from the group consisting of sulfolane, 3-methyl sulfolane, tetraglyme and methyl oxazolidinone are stable with respect to elastomers and organic pigments and have no effect on the sealant. In respect of the stability under a high-temperature environment, since the boiling point of sulfolane is 287° C., the boiling point of 3-methyl sulfolane is 276° C., the boiling point of tetraglyme is 275° C. and the boiling point of methyl oxazolidinone is 270° C., evaporation and decomposition of the electrolytes do not occur under environments of not higher than the respective boiling points. For this reason, even in the reflow furnace reaching about 250° C., the electrochemical element can exist in a stable state without causing degradation of the sealant due to heat and decomposition of the electrolyte, thereby maintaining the battery characteristics and enabling mounting by the reflow method.

INDUSTRIAL APPLICABILITY

According to the present invention, by setting the color of an organic pigment to be added to a sealant so that it differs from the colors of components constituting an electrochemical element, it is possible to evaluate and judge the applied state when the sealant was applied, based on the difference in the colors of the respective components. Accordingly, elements that are below standards of the applied state and have a possibility to cause an electrolyte leakage can be eliminated from the production process. It is therefore possible to provide an electrochemical element with a significantly decreased ratio of defective units that would cause an electrolyte leakage. In particular, the accuracy of the evaluation and judgment of the applied state by image recognition is significantly improved, thereby greatly contributing to an improvement of the productivity in the substantially fully automated mounting process. Furthermore, by using elastomers for the sealant, it is possible to perform the reflow mounting of the electrochemical element in a temperature range of not lower than 260° C. corresponding to lead-free solder, and thus the present invention can solve environmental problems and its industrial value is extremely high.

The invention claimed is:

1. An electrochemical element comprising: an element unit in which a positive electrode and a negative electrode are disposed to face each other with a separator therebetween; an electrolyte in contact with said element unit; a metal case for accommodating said element unit and said electrolyte; wherein the metal case comprises a major inner face and a minor inner face; a sealing body for sealing an opening of said metal case; and a sealant in a form of a layer sandwiched between the major inner face of said metal case and a major outer face of said sealing body, characterized in that said sealant is in direct contact with the major inner face of said metal case and the major outer face of said sealing body, and said sealant comprises an elastomer as a main component and an organic pigment and is colored in a color different from said metal case and sealing body.

2. The electrochemical element as set forth in claim 1, wherein said organic pigment has chemical affinity for the elastomer and is evenly dispersed in the sealant.

3. The electrochemical element as set forth in claim 1, wherein said organic pigment provides an even color in the sealant.

4. The electrochemical element as set forth in claim 1, wherein said sealing body comprises a synthetic resin or rubber.

5. An electrochemical element comprising: an element unit in which a positive electrode and a negative electrode are disposed to face each other with a separator therebetween; an electrolyte in contact with said element unit; a metal case for accommodating said element unit and said electrolyte; a sealing body for sealing an opening of said metal case; and a sealant in a form of a layer sandwiched between a major inner face of said metal case and a major outer face of said sealing body, characterized in that said sealant is in direct contact with the major inner face of said metal case and the major outer face of said sealing body, and said sealant comprises an elastomer as a main component and an organic pigment and is colored in a color different from said metal case and sealing body, wherein said organic pigment is an organic pigment composed of a phthalocyanine-based metal complex.

6. An electrochemical element comprising: an element unit in which a positive electrode and a negative electrode are disposed to face each other with a separator therebetween; an electrolyte in contact with said element unit; a metal case for accommodating said element unit and said electrolyte; a metal sealing plate for sealing an opening of said metal case; a gasket interposed between said metal case and said sealing plate; and a sealant in a form of a layer sandwiched between a major inner face of said metal case and a major outer face of said gasket, characterized in that said sealant is in direct contact with the major outer face of said gasket and with the major inner face of said metal case, and said sealant comprises an elastomer as a main component and an organic pigment and is colored in a color different from said metal case, gasket and sealing plate.

7. The electrochemical element as set forth in claim 6, wherein said organic pigment has chemical affinity for the elastomer and is evenly dispersed in the sealant.

8. The electrochemical element as set forth in claim 6, wherein said organic pigment provides an even color in the sealant.

9. An electrochemical element comprising: an element unit in which a positive electrode and a negative electrode are disposed to face each other with a separator therebetween; an electrolyte in contact with said element unit; a metal case for accommodating said element unit and said electrolyte; a metal sealing plate for sealing an opening of said metal case; a gasket interposed between said metal case and said sealing plate; and a sealant in a form of a layer sandwiched between a major inner face of said metal case and a major outer face of said gasket or between a major outer face of said sealing plate and a major inner face of said gasket, characterized in that said sealant is in direct contact with the major inner or major outer face of said gasket and with the major inner face of said metal case or the major outer face of said sealing plate, and said sealant comprises an elastomer as a main component and an organic pigment and is colored in a color different from said metal case, gasket and sealing plate, wherein said organic pigment is an organic pigment composed of a phthalocyanine-based metal complex.

10. An electrochemical element comprising: an element unit in which a positive electrode and a negative electrode are disposed to face each other with a separator therebetween; an electrolyte in contact with said element unit; a metal case for accommodating said element unit and said electrolyte; a metal sealing plate for sealing an opening of said metal case; a gasket interposed between said metal case and said sealing plate; and a sealant in a form of a layer sandwiched between a major inner face of said metal case and a major outer face of said gasket and between a major outer face of said sealing plate and a major inner face of said gasket, characterized in that said sealant is in direct contact with the major inner and major outer faces of said gasket and with the major inner face of said metal case and the major outer face of said sealing plate, and said sealant comprises an elastomer as a main component and an organic pigment and is colored in a color different from said metal case, gasket and sealing plate.

11. The electrochemical element as set forth in claim 10, wherein said organic pigment is an organic pigment composed of a phthalocyanine-based metal complex.

* * * * *